US010197695B2

(12) United States Patent
Itskovich et al.

(10) Patent No.: US 10,197,695 B2
(45) Date of Patent: Feb. 5, 2019

(54) METHOD AND APPARATUS FOR ESTIMATING FORMATION PROPERTIES USING TRANSIENT ELECTROMAGNETIC MEASUREMENTS WHILE DRILLING

(71) Applicants: Gregory B. Itskovich, Houston, TX (US); Sushant M. Dutta, Houston, TX (US); Steven Allen Morris, Spring, TX (US); Marina Nikitenko, Novosibirsk (RU)

(72) Inventors: Gregory B. Itskovich, Houston, TX (US); Sushant M. Dutta, Houston, TX (US); Steven Allen Morris, Spring, TX (US); Marina Nikitenko, Novosibirsk (RU)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 251 days.

(21) Appl. No.: 15/045,808

(22) Filed: Feb. 17, 2016

(65) Prior Publication Data

US 2017/0235012 A1     Aug. 17, 2017

(51) Int. Cl.
*E21B 49/00*     (2006.01)
*G01V 3/28*     (2006.01)
(Continued)

(52) U.S. Cl.
CPC ............ *G01V 3/28* (2013.01); *E21B 7/04* (2013.01); *E21B 44/00* (2013.01); *E21B 47/122* (2013.01); *E21B 49/00* (2013.01); *G01V 3/38* (2013.01)

(58) Field of Classification Search
None
See application file for complete search history.

(56) References Cited

U.S. PATENT DOCUMENTS 5,581,024 A * 12/1996 Meyer, Jr. ............... G01V 3/38
                                                                  702/6
5,883,515 A    3/1999 Strack et al.
(Continued)

FOREIGN PATENT DOCUMENTS

WO    2012109433 A2    8/2012

OTHER PUBLICATIONS

"Oilfield Bucking Units", Weatherford, Tubular Running Services, [Retrieved from the Internet, Jun. 21, 2017] www.weatherford.com/doc/wft130408; 3 pages.
(Continued)

*Primary Examiner* — Michael Lebentritt
(74) *Attorney, Agent, or Firm* — Cantor Colburn LLP

(57) ABSTRACT

A method for estimating a property of an earth formation penetrated by a borehole, the method comprising generating a first transient electromagnetic fields with a transmitter on a carrier located outside of the borehole and receiving associated signals, calculating a bucking coefficient using the measured signals, conveying the carrier through a borehole, generating a second transient electromagnetic field and receiving associated signals, calculating, a bucked signal using the bucking coefficient and the downhole signals, calculating synthetic formation signals, calculating synthetic formations signals by applying a Duhamel's integral to the measured signals and the synthetic formation signals, calculating a synthetic bucked signal, and performing an inversion of a formation model to estimate a property of the formation such that an inverted synthetic bucked signal and an inverted bucked signal coincide within a predetermined range.

21 Claims, 8 Drawing Sheets

(51) Int. Cl.
*E21B 7/04* (2006.01)
*E21B 44/00* (2006.01)
*E21B 47/12* (2012.01)
*G01V 3/38* (2006.01)

(56) References Cited

U.S. PATENT DOCUMENTS

| | | | | |
|---|---|---|---|---|
| 5,892,361 | A * | 4/1999 | Meyer, Jr. | G01V 3/30 |
| | | | | 324/338 |
| 6,204,667 | B1 * | 3/2001 | Won | G01V 3/104 |
| | | | | 324/239 |
| 6,288,548 | B1 * | 9/2001 | Thompson | G01V 3/30 |
| | | | | 324/339 |
| 6,586,939 | B1 * | 7/2003 | Fanini | G01V 3/28 |
| | | | | 324/339 |
| 6,765,385 | B2 * | 7/2004 | Sinclair | G01V 3/30 |
| | | | | 324/338 |
| 6,891,376 | B2 | 5/2005 | Hanstein et al. | |
| 7,301,429 | B1 * | 11/2007 | Hall | E21B 47/01 |
| | | | | 324/339 |
| 7,408,355 | B1 * | 8/2008 | Forgang | G01V 3/28 |
| | | | | 324/339 |
| 7,598,741 | B2 * | 10/2009 | Fanini | G01V 3/28 |
| | | | | 324/334 |
| 7,994,790 | B2 * | 8/2011 | Itskovich | G01V 3/28 |
| | | | | 324/338 |
| 8,030,935 | B2 * | 10/2011 | Xiao | G01V 3/28 |
| | | | | 324/338 |
| 8,332,152 | B2 | 12/2012 | Itskovich et al. | |
| 8,762,107 | B2 * | 6/2014 | Pelegri | G01V 13/00 |
| | | | | 219/121.11 |
| 9,310,511 | B2 * | 4/2016 | Itskovich | G01V 3/38 |
| 9,857,499 | B2 * | 1/2018 | Itskovich | E21B 49/00 |
| 2004/0183538 | A1 | 9/2004 | Hanstein et al. | |
| 2005/0049791 | A1 | 3/2005 | Besplav et al. | |
| 2005/0093547 | A1 * | 5/2005 | Xiao | G01V 3/28 |
| | | | | 324/339 |
| 2005/0140374 | A1 * | 6/2005 | Itskovich | G01V 3/28 |
| | | | | 324/339 |
| 2006/0192562 | A1 | 8/2006 | Davydychev et al. | |
| 2007/0216416 | A1 | 9/2007 | Itskovich | |
| 2008/0270032 | A1 | 10/2008 | Nikitenko et al. | |
| 2009/0114009 | A1 | 5/2009 | Thambynayagam et al. | |
| 2009/0240435 | A1 | 9/2009 | Itskovich et al. | |
| 2009/0243618 | A1 | 10/2009 | Wang et al. | |
| 2010/0097065 | A1 | 4/2010 | Itskovich et al. | |
| 2010/0109905 | A1 | 5/2010 | Itskovich et al. | |
| 2010/0171501 | A1 | 7/2010 | Alumbaugh et al. | |
| 2011/0257886 | A1 | 10/2011 | Itskovich et al. | |
| 2014/0121974 | A1 * | 5/2014 | Itskovich | G01V 3/38 |
| | | | | 702/7 |
| 2014/0207379 | A1 | 7/2014 | Björnemo | |
| 2015/0115965 | A1 | 4/2015 | Riederman et al. | |
| 2015/0241592 | A1 | 8/2015 | Itskovich et al. | |
| 2017/0235012 | A1 * | 8/2017 | Itskovich | E21B 7/04 |
| | | | | 175/24 |
| 2017/0261633 | A1 * | 9/2017 | Morris | G01V 3/30 |
| 2017/0261635 | A1 * | 9/2017 | Morris | G01V 3/30 |
| 2017/0261636 | A1 * | 9/2017 | Morris | G01V 3/08 |
| 2017/0269252 | A1 * | 9/2017 | Fang | G01V 3/20 |

OTHER PUBLICATIONS

International Search Report for International Application No. PCT/US2017/017928 dated May 29, 2017 (3 pp.).
Written Opinion of the International Searching Authority for International Application No. PCT/US2017/017928 dated May 29, 2017 (6 pp.).

* cited by examiner

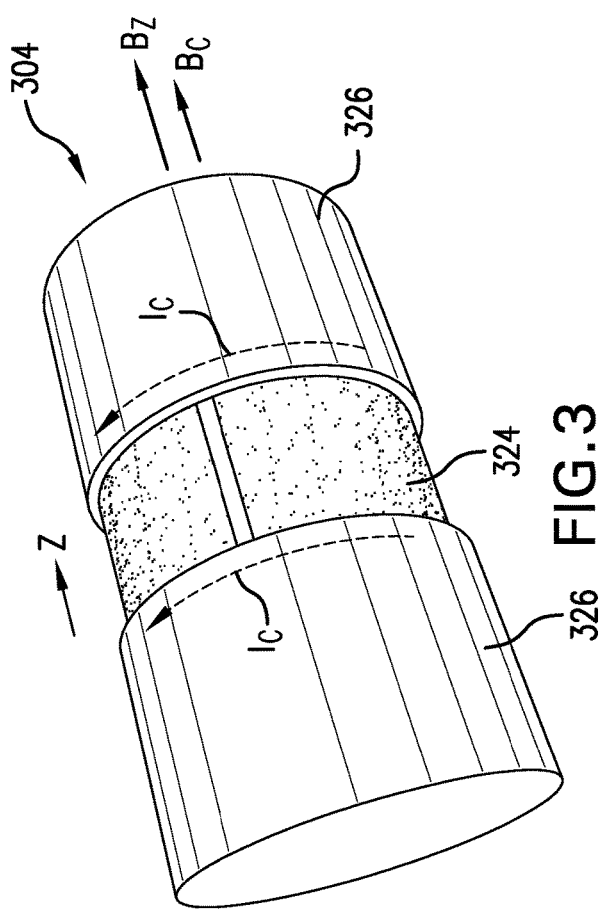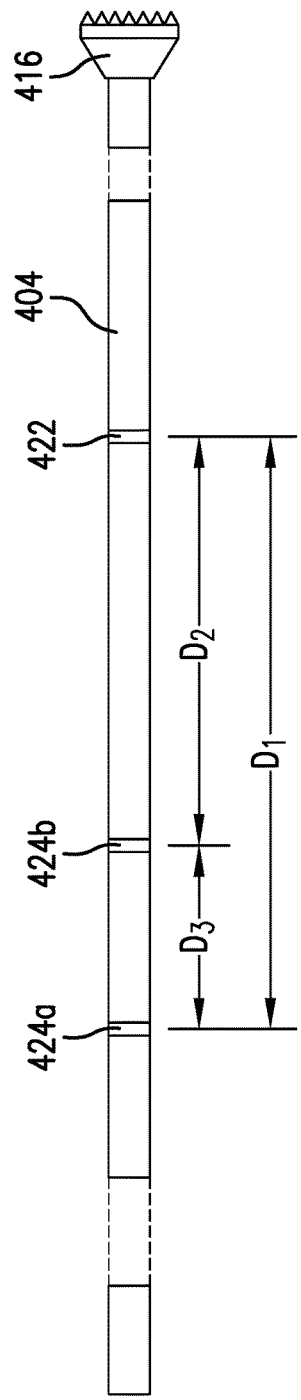

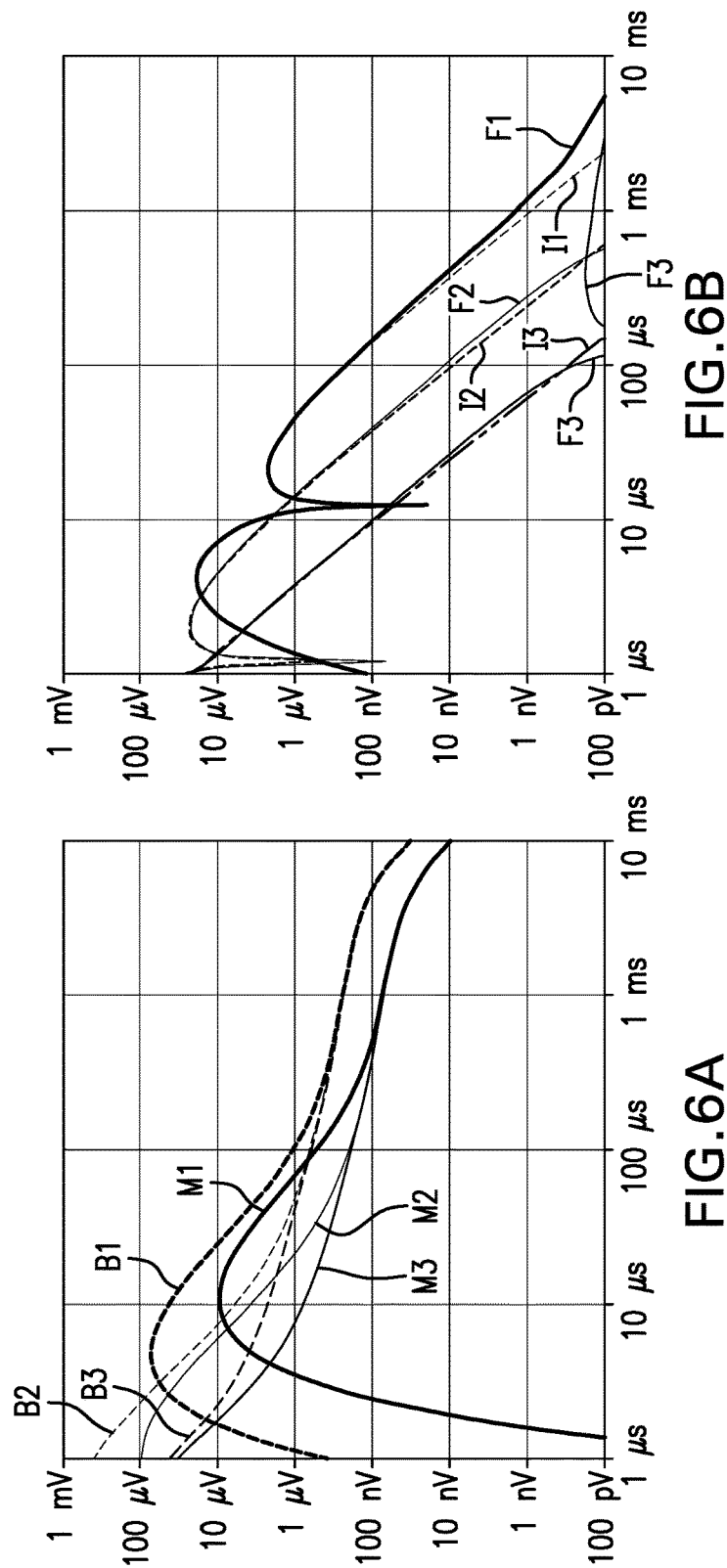

METHOD AND APPARATUS FOR ESTIMATING FORMATION PROPERTIES USING TRANSIENT ELECTROMAGNETIC MEASUREMENTS WHILE DRILLING

BACKGROUND

The ultimate objective of any geophysical experiment is to find properties of a formation using the measured data. To accomplish the objective a processing technique, called inversion, is applied. Inversion requires a mathematical model, which is used to produce synthetic data. The model has to include all of the necessary parameters that affect the measurements because an accurate model is needed for a successful inversion. Because the amount of recordable data is limited, no geophysical inverse problem is uniquely solvable and inferences of formation properties are statistical.

The possibility to reduce the range of uncertainty in the inverted models is driven by the sensitivity of the data to parameters of interest and a level of noise in the data. The noise can be either random or systematic. Because of this, mechanisms for improving sensitivity to the parameters of a formation have been developed. For example, a technique referred to as bucking was developed to improve sensitivity to the parameters of the formation while eliminating systematic noise caused by a primary field and/or the conductive tools used to make the measurements. If bucking does not account for electromagnetic interference between a conductive tool body and a formation, this interference will create or be a source of additional systematic noise. For this reason, it is beneficial to develop techniques for reducing inconsistency between measured and synthetic model responses and thus reduce uncertainty in estimated parameters of a formation.

SUMMARY

A method for estimating a property of an earth formation penetrated by a borehole is provided. The method includes generating a first transient electromagnetic field with a transmitter on a carrier located outside of the borehole, receiving at a first receiver on the carrier a first measured signal due to the first transient electromagnetic field, the first measured signal affected by a finite, non-zero conductivity of the carrier, receiving at a second receiver on the carrier a second measured signal due to the first transient electromagnetic field, the second measured signal affected by a finite, non-zero conductivity of the carrier, calculating, with a processor, a bucking coefficient k using the first measured signal and the second measured signal, the bucking coefficient based on a ratio of the first measured signal and the second measured signal, conveying the carrier through a borehole, generating a second transient electromagnetic field using the transmitter on the carrier when the carrier is disposed within the borehole, receiving a third measured signal at the first receiver, the third measured signal being a signal generated in the presence of the formation due to the second transient electromagnetic field, receiving a fourth measured signal at the second receiver, the fourth measured signal being a signal generated in the presence of the formation due to the second transient electromagnetic field, calculating, with the processor, a bucked signal using the bucking coefficient k, the third measured signal, and the fourth measured signal, calculating, with the processor, a first synthetic formation signal of the first receiver representing a signal received by the first receiver in the absence of the carrier, calculating, with the processor, a second synthetic formation signal of the second receiver representing a signal received by the second receiver in the absence of the carrier, calculating, with the processor, a third synthetic formation signal by applying a Duhamel's integral to the first measured signal and the first synthetic formation signal, calculating, with the processor, a fourth synthetic formation signal by applying a Duhamel's integral to the second measured signal and the second synthetic formation signal, calculating a synthetic bucked signal using the calculated bucking coefficient k, the third synthetic formation signal, and the fourth synthetic formation signal, and performing an inversion of a formation model to estimate a property of the formation such that an inverted synthetic bucked signal and an inverted bucked signal coincide within a predetermined range.

A system for estimating a property of an earth formation penetrated by a borehole is provided. The system includes a carrier configured to be conveyed through a borehole, a transmitter disposed on the carrier and configured to transmit transient electromagnetic fields, a first receiver disposed on the carrier a first distance from the transmitter and configured to receive signals from the transmitter, a second receiver disposed on the carrier a second distance from the transmitter and configured to receive signals from the transmitter, and a processor configured to estimate a property of the formation. The system is configured to generate a first transient electromagnetic field with the transmitter when the carrier is located outside of the borehole, receive at the first receiver a first measured signal due to the first transient electromagnetic field, the first measured signal affected by a finite, non-zero conductivity of the carrier, receive at the second receiver a second measured signal due to the first transient electromagnetic field, the second measured signal affected by a finite, non-zero conductivity of the carrier, calculate, with the processor, a bucking coefficient k using the first measured signal and the second measured signal, the bucking coefficient based on a ratio of the first measured signal and the second measured signal, generate a second transient electromagnetic field using the transmitter on the carrier when the carrier is disposed within the borehole, receive a third measured signal at the first receiver, the third measured signal being a signal generated in the presence of the formation due to the second transient electromagnetic field, receive a fourth measured signal at the second receiver, the fourth measured signal being a signal generated in the presence of the formation due to the second transient electromagnetic field, calculate, with the processor, a bucked signal using the bucking coefficient k, the third measured signal, and the fourth measured signal, calculate, with the processor, a first synthetic formation signal of the first receiver representing a signal received by the first receiver in the absence of the carrier, calculate, with the processor, a second synthetic formation signal of the second receiver representing a signal received by the second receiver in the absence of the carrier, calculate, with the processor, a third synthetic formation signal by applying a Duhamel's integral to the first measured signal and the first synthetic formation signal, calculate, with the processor, a fourth synthetic formation signal by applying a Duhamel's integral to the second measured signal and the second synthetic formation signal, calculate a synthetic bucked signal using the calculated bucking coefficient k, the third synthetic formation signal, and the fourth synthetic formation signal, and perform, with the processor, an inversion of a formation model to estimate a property of the formation such that an inverted synthetic bucked signal and an inverted bucked signal coincide within a predetermined range.

BRIEF DESCRIPTION OF THE DRAWINGS

The following descriptions should not be considered limiting in any way. With reference to the accompanying drawings, like elements are numbered alike:

FIG. 3 is a schematic illustration of a portion of a carrier in accordance with an embodiment of the present disclosure;

FIG. 4 is a schematic illustration of a carrier having a drill bit configured in accordance with an embodiment of the present disclosure;

FIG. 6A is a schematic plot of simulated signals in a main receiver and a bucking receiver in the presence of a conductive carrier surrounded by homogeneous formations;

FIG. 6B is a schematic plot of bucked signals minimally affected by a carrier and having a high sensitivity to a formation;

The detailed description explains embodiments of the present disclosure, together with advantages and features, by way of example with reference to the drawings.

DETAILED DESCRIPTION

A detailed description of one or more embodiments of the disclosed apparatuses and methods presented herein are presented by way of exemplification and not limitation, with reference made to the appended figures.

Disclosed are methods and systems for estimating a property of an earth formation using a single transmitter and at least two receivers, all located along a carrier disposed in a borehole within the formation. Outputs from the at least two receivers are used to generate signals that are used to generate and/or calculate synthetic signals. The actual signals and the synthetic signals are compared to enable selection of a best-fit model and thus an efficient and accurate estimation of properties of the formation may be obtained. Further, provided herein are methods and systems for estimating formation properties using a transient electromagnetic measurement in presence of conductive pipe. The methods and systems include taking electromagnetic measurements in at least two receivers and combining the measured signals to derive a bucked signal minimally affected by the pipe. The signal is the subject of inversion, aimed at finding parameters of a model providing a best match between measured and synthetic data. The synthetic data or response is generated using approximate forward modeling solution, obtained via Duhamel's integral applied to formation signals in the absence of the pipe and, in some embodiments, a system step response estimated in the presence of the pipe in the air.

Figure 1:
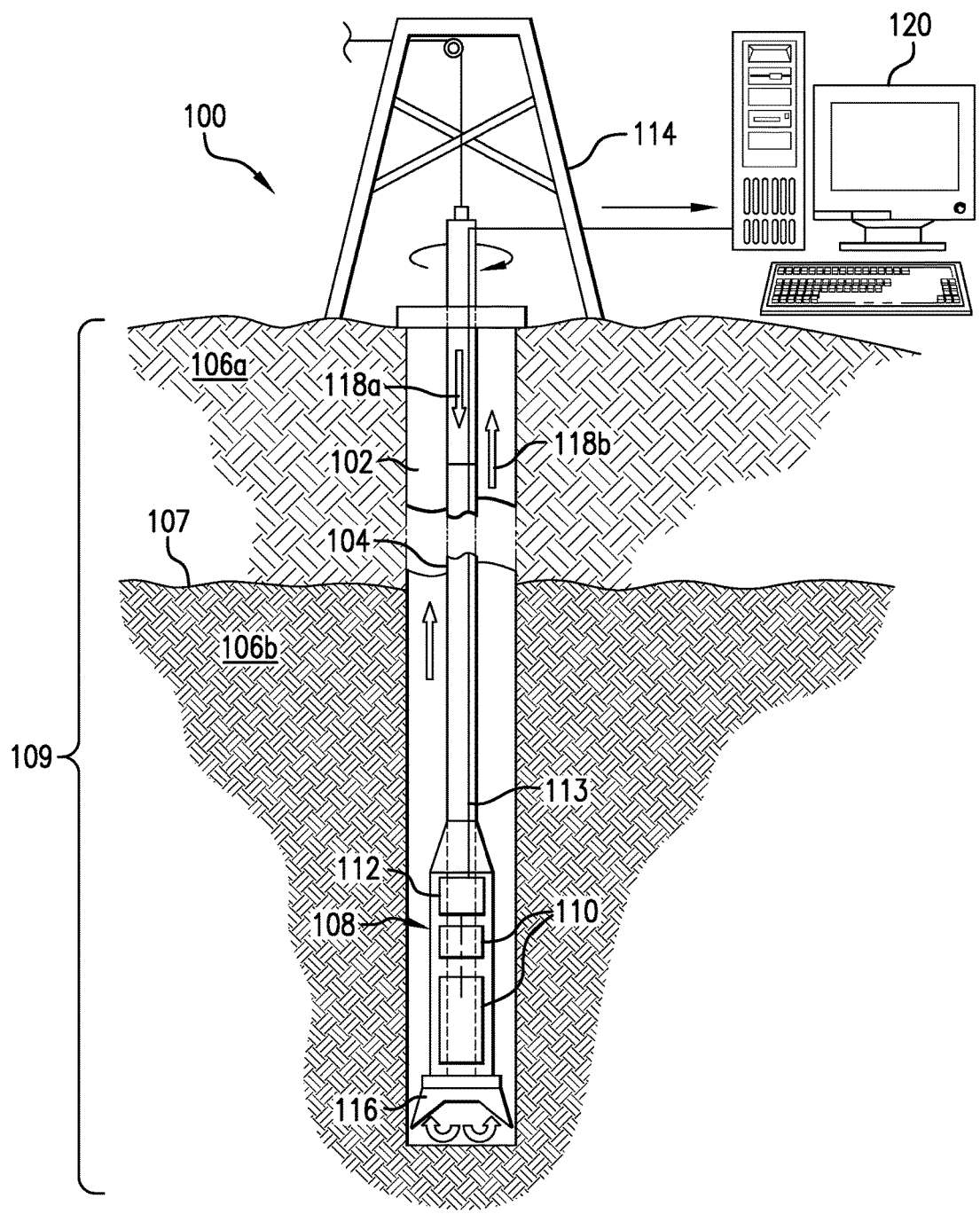
FIG. 1 is a cross-sectional view of an embodiment of a downhole drilling, monitoring, evaluation, exploration and/or production system in accordance with an embodiment of the present disclosure.

Referring to FIG. 1, a non-limiting schematic illustration of a downhole drilling, monitoring, evaluation, exploration, and/or production system 100 associated with a borehole 102 is shown. A carrier 104 is run in the borehole 102, which penetrates one or more earth formations 106a, 106b for facilitating operations such as drilling, extracting matter from the formation, sequestering fluids such as carbon dioxide, and/or making measurements of properties of the formations 106a, 106b, a formation interface 107 (i.e., the interface between the formations 106a, 106b), and/or the borehole 102 downhole. The carrier 104 includes any of various components to facilitate subterranean operations. In various embodiments, the carrier 104 is constructed of, for example, a pipe, multiple pipe sections, flexible tubing, or other structures. In other configurations, the carrier 104 is constructed of an armored wireline, such as that used in wireline logging. The carrier 104 is configured to include, for example, a drilling system and/or a bottom-hole assembly (BHA) on a downhole end thereof.

The system 100 and/or the carrier 104 may include any number of downhole tools 108 for various processes including drilling, hydrocarbon production, and formation evaluation for measuring one or more physical properties, characteristics, quantities, etc. in and/or around the borehole 102. For example, in some embodiments, the downhole tools 108 include a drilling assembly and/or a pumping assembly. Various measurement tools can be incorporated into the system 100 to affect measurement regimes such as wireline measurement applications, measurement-while-drilling (MWD), and/or logging-while-drilling (LWD) applications.

While the system 100 may operate in any subsurface environment, FIG. 1 shows the downhole tools 108 disposed in the borehole 102 penetrating the earth 109 (including a first formation 106a and a second formation 106b). The downhole tools 108 are disposed in the borehole 102 at a distal end of the carrier 104. As shown, the downhole tools 108 include measurement tools 110 and downhole electronics 112 configured to perform one or more types of measurements in LWD or MWD applications and/or operations. In a LWD or MWD configuration, the carrier 104 is a drill string. The measurements may include measurements related to drill string operation, for example.

A drilling rig 114 is configured to conduct drilling operations such as rotating the carrier 104 (e.g., a drill string) and, thus, a drill bit 116 located on the distal end of the carrier 104. As shown, the drilling rig 114 is configured to pump drilling fluid 118a through the carrier 104 in order to lubricate the drill bit 116. The drilling fluid 118a becomes a flushing fluid 118b to flush cuttings from the borehole 102.

The downhole electronics 112 are configured generate data, i.e., collect data, at the downhole tools 108. Raw data and/or information processed by the downhole electronics 112 may be telemetered along telemetry 113 to the surface for additional processing or display by a computing system 120. In some configurations, drilling control signals are generated by the computing system 120 and conveyed downhole the downhole tools 108 or, in alternative configurations, are generated within the downhole electronics 112 or by a combination thereof. The downhole electronics 112 and the computing system 120 may each include one or more processors and one or more memory devices.

Different layers or formations of the earth 109 may each have a unique resistivity. For example, the first formation 106a may have a first resistivity and the second formation 106b may have a second resistivity. Depending on the compositions of the first formation 106a and the second formation 106b, the first resistivity may be different from the second resistivity. In order to measure and/or detect these resistivities, and thus extract information regarding the formations 106a, 106b, and/or the interface 107 therebetween, the downhole tools 108 are configured to obtain electromagnetic information. Accordingly, the downhole tools 108 include one or more transmitters (transmitter coils) that turn a current impulse in a transmitter coil on and off to induce a current in the earth 109 (e.g., formations 106a, 106b). One or more receivers are be configured to receive a resulting transient electromagnetic (TEM) signal. Those of skill in the art will appreciate that the transmitter(s) and receiver(s) may be one-, two-, or tri-axis devices, and/or other transceiver devices may be employed without departing from the scope of the present disclosure. The transmitters may use magnetic dipoles to induce currents in the earth 109.

Figure 2:
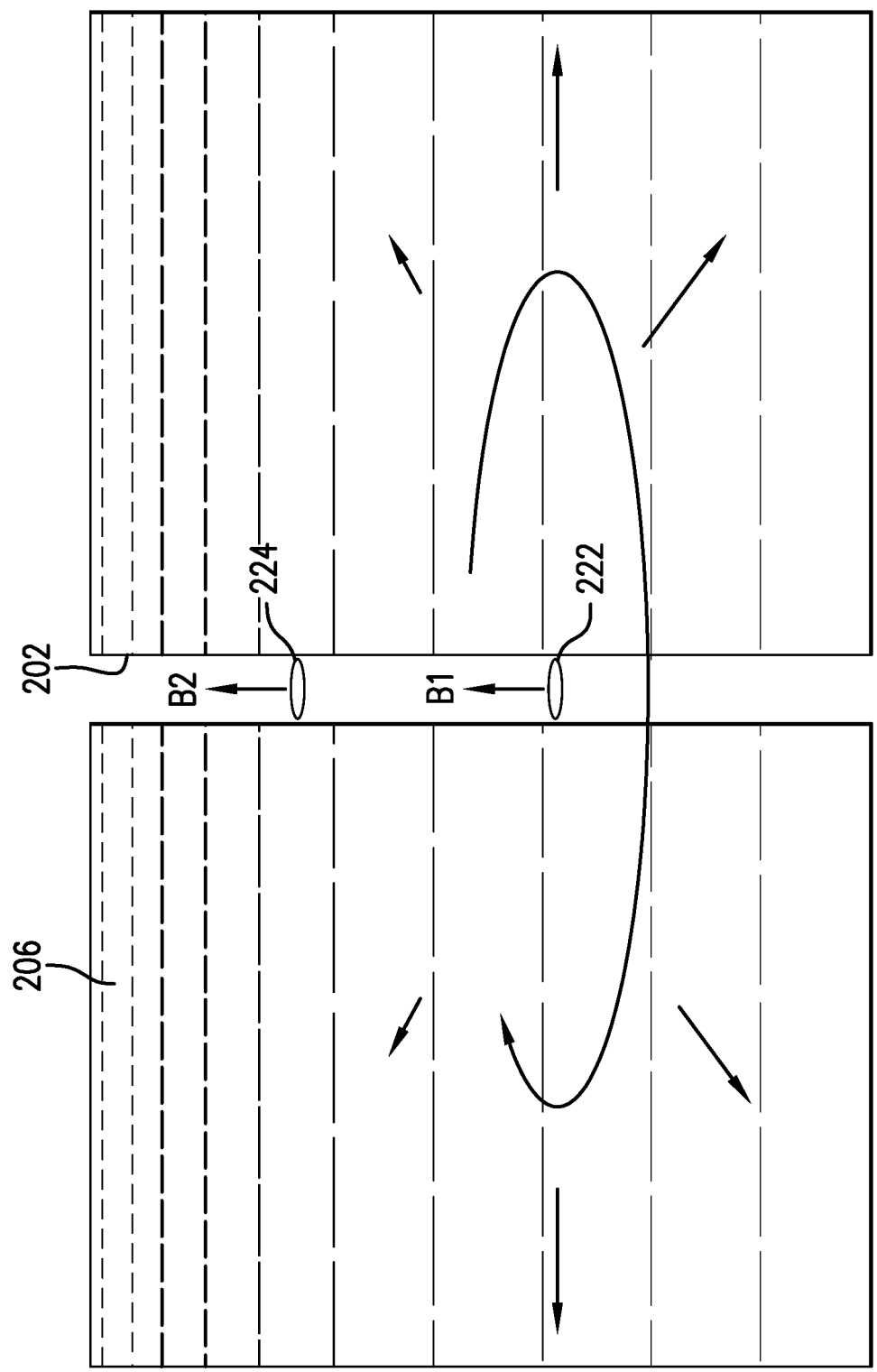
FIG. 2 is a schematic illustration of eddy currents generated in a formation in accordance with an embodiment of the present disclosure.

Turning now to FIG. 2, a schematic illustration of a transient electromagnetic method of downhole geophysical measurement is shown. A formation 206 is shown having a borehole 202 formed therein. Components of a downhole tool are schematically shown as a transmitter 222 and a receiver 224. The transmitter 222 is configured to employ a fast reversing magnetic dipole, denoted as primary magnetic field B1 to induce currents in the formation 206. These currents diffuse outward away from the borehole 202, as schematically illustrated. The currents within the formation generate a secondary magnetic field B2. As configured, a derivative of the secondary magnetic field B2 is sensed by the receiver 224. Accordingly, a measurement obtained by the downhole tool, e.g., receiver 224, consists of transient voltages generated in coils of the received 224. Inversion of geophysical data (e.g., the measured magnetic field at the receiver 224) enables making inferences about properties of the formation 206 from the acquired data. Mathematically, the inferences involve a process of finding model that provides a best-fit between the measurements and synthetic data, wherein the synthetic data is data configured to remove known uncertainties.

For example, the fast reversing magnetic dipole of the transmitter 222 may induce eddy currents in the carrier that supports and carries the downhole tools including the transmitter 222 and the received 224 (e.g., as shown in FIG. 1), which results in uncertainty in the model fitting. For example, when an electrically conductive structural member forms part of the carrier (e.g., a drill string), uncertainty in signals can arise. In one non-limiting example, a drill collar is configured to carry a transient electromagnetic apparatus (e.g., the electromagnetic apparatus includes the transmitter 222 and the receiver 224).

As shown in FIG. 3, an illustration of the interaction of transmitted magnetic field and magnetic field from currents induced in the carrier 304 during a transient measurement are shown. In the configuration of FIG. 3, a transmitter (not shown) is oriented in the axial direction, designated as a Z direction. A receiver 324 is configured as a cylindrical magnetically permeable core mounted in a recess of the carrier 304, such as a conductive metallic mandrel 326 of a downhole tool. At the beginning of a transient measurement, the transmitter, located a predetermined distance away in the Z direction, may produce a step Bz in magnetic field along the axis of the receiver 324 (e.g., along the Z direction of the receiver 324). The magnetic core of the receiver 324 shields the carrier 304 from the step Bz in magnetic field, but at the edges of the magnetic core of the receiver 324 a circumferential current Ic may be induced in the metallic mandrel 326 of the carrier 304. In accordance with Lenz's Law the induced circumferential current Ic will produce a magnetic field Bc that opposes the transmitter induced step Bz in magnetic field.

Accordingly, a summation of the transmitter magnetic field (e.g., Bz) and carrier current induced magnetic field (e.g., Bc) to produce the total axial magnetic field in the vicinity of the receiver 324 is a measured magnetic field, and thus modified from an actual induced current from a formation. The total magnetic field (e.g., measurement) consists of a step from the transmitter and an opposing magnetic field from the carrier currents, which have a magnitude that decreases with time. Accordingly, a total sum and a secondary field that is induced by the sum in the formation can be measured.

This additional magnetic field can result in measurements that deviate from a desired measurement. That is, the additional magnetic field alters measured results and thus impact models that are desired to determine a structure, composition, and/or other characteristic of one or more formations in the earth. As time passes during measurements, the cumulative effect of the carrier signal causes modeling to diverge significantly from a data-set (e.g., measurements) that were based solely on signals measured without the influence and/or impact of a magnetic field in a carrier. That is, while the magnetic field from carrier currents affects a formation response, it may also dominate a signal measured in the receiver, effectively masking a formation response during the measurement.

Referring to FIG. 4, a schematic illustration of a carrier 404 configured to account for a carrier induced signal is shown. The carrier 404 is configured to perform an operation referred to as bucking, wherein a carrier induced signal is detected and then removed from a total signal to thus extract out a formation signal. As shown, the carrier 404 is configured with a bit 416 disposed on a distal end of the carrier 404. A transmitter 422 is located on the carrier 404 and a first, or main, receiver 424a is located on the carrier 404 at a first distance D1 from the transmitter 422. A second, or bucking, receiver 424b is located on the carrier 404 at a second distance D2 from the transmitter 422. The carrier induced signal is suppressed by using the two receivers 424a, 424b which are spaced apart by a third distance D3 (i.e., the difference between distances D1 and D2). The signal induced in the receivers 424a, 424b by carrier currents is proportional to the cube of the distance between the specific receiver 424a, 424b and the transmitter 422, while a formation signal is almost equal in each receiver 424a, 424b. This allows the carrier signal to be bucked out (e.g., eliminated and/or accounted for) and the measured formation signal is extracted. As shown, the bucking receiver (second receiver 424b) is shown as closer to the transmitter 422 than the main receiver (first receiver 424a). This configuration is merely provided for illustrative purposes and is not intended to be limiting.

The bucking process is used to reduce uncertainty in measured data. However, other sources of uncertainty exist, such that additional techniques are desirable. In addition to the bucking technique, synthetic data may be used to reduce the uncertainty of measurements, thus enabling better modeling and/or fits to models. The synthetic data is data that represents certain characteristics or components of a signal which are then accounted for in processing of measured real-world data, such that the output is an accurate reflection of the characteristics, features, and/or properties of the formation located in the earth. For example, if real-world data (e.g., measurements) are affected by a conductivity of a carrier in a downhole operation, the synthetic data have to be affected by the carrier as well. As provided herein, approximated modeling for a fast calculation of synthetic signal from the formation in the presence of a conductive carrier is provided.

In accordance with embodiments of the present disclosure, a derivation of a synthetic response used in inversion is provided that utilizes both Duhamel's integral and bucking (as described above). The synthetic data are calculated via Duhamel's integral by using a formation signal in the absence of the carrier and a system step response, which takes into account characteristics of a transmitter, one or more receivers, geometry and electrical properties of the carrier, etc. The system step response is defined as a signal measured in a receiver in a relatively resistive environment (e.g., in the air), when the transmitter is excited by a u(t)-step function.

In various embodiments of the present disclosure, a derivation of a synthetic response is provided that takes into account a carrier-formation interaction and maintains a high sensitivity to parameters of formation. The derived synthetic response is further utilized to ensure reliable properties of formation from inversion.

As will be appreciated by those of skill in the art, and described above, a formation has a resistivity associated therewith. The resistivity of the formation enables measurements of magnetic fields such that data may be generated that are representative of the formation. This data is then used to find a best-fit model, and thus an estimation of the physical characteristics and/or make-up of the formation may be made. Further, as noted above, a carrier, particularly a metallic carrier, introduces uncertainty when fitting a model to the data. One source of such uncertainty is a magnetic field induced by the carrier itself, as described above, and is accounted for by a bucking process.

Another source of uncertainty is from an interface between the carrier and the formation. This interface generates a residual interference which is not be accounted for by the bucking process. Embodiments provided herein supply a solution that takes advantage of a significant difference in resistivity between a highly conductive carrier (e.g., a steel pipe; approximately 10-6Ω) and relatively a resistive earth formation (e.g., greater than 1Ω). The transmitter, being mounted on the carrier, generates strong eddy currents on a surface of the carrier (e.g., the mandrels of the carrier; see FIG. 3). The corresponding electromagnetic field from the carrier dominates over the signal caused by the formation. Because conductivity of the carrier is much larger than conductivity of the formation, the decay of the transient process is mainly driven by the slowly decaying eddy currents on the carrier. These currents act as a secondary source with respect to the formation. The receivers, mounted on the carrier, will then measure a total signal caused by both eddy currents on the carrier and in the formation.

A model, in accordance with the present disclosure, is comprised of an arbitrary formation surrounding a transient transmitter-receiver system mounted on a conductive carrier. The transmitter represents a coil with a current, whose magnetic moment can be turned on and off. The following discussion refers to various terms, wherein:

b'(t) is a system step response, which represents $$\frac{db}{dt}$$

in a receiver in the presence of the carrier. The current in the transmitter has shape of step-function u(t) and measurements are taken in the absence of formation (in the air); and f(t) is a formation response, which represents a signal in the receiver excited by the transmitter in the absence of the carrier. The current in the transmitter has shape of step-function u(t).

Figure 5:
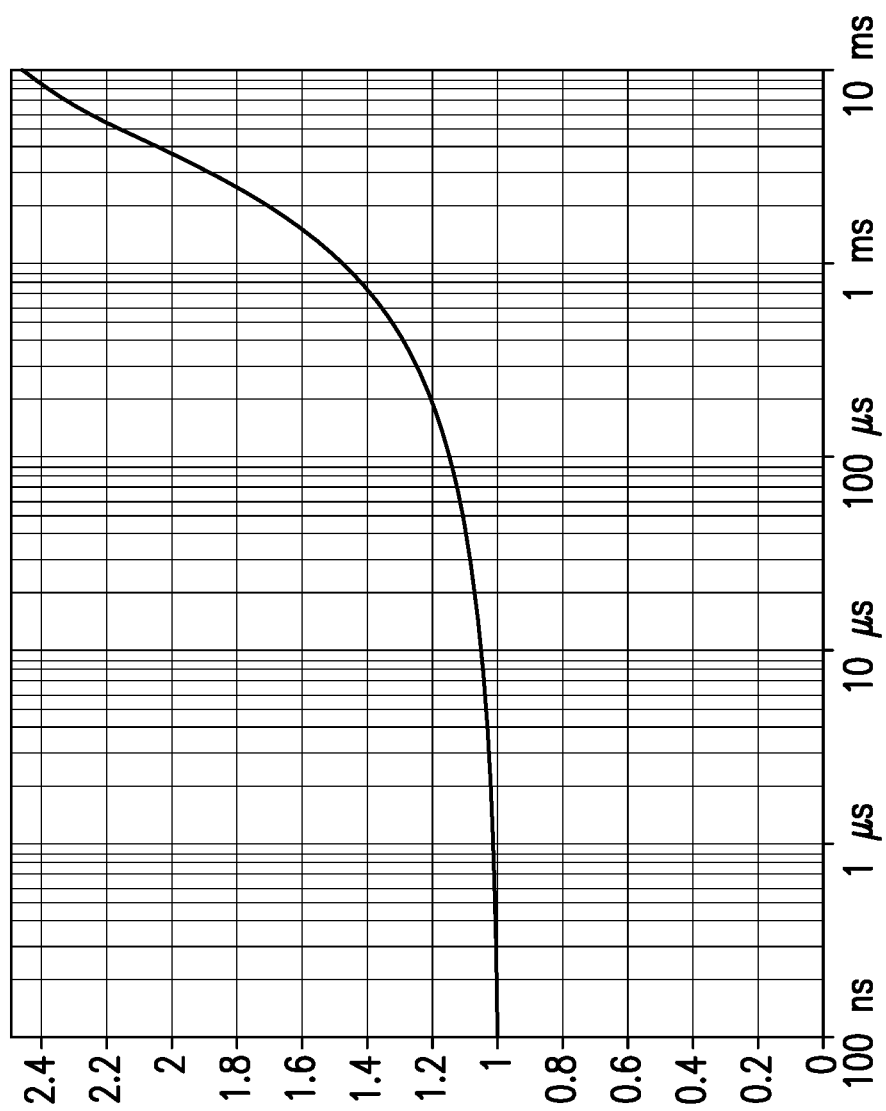
FIG. 5 is a schematic plot of a magnetic field in a formation as a function of time.

A normalized function $$\bar{b}(t) = \frac{b(t)}{b_0}$$

is plotted in FIG. 5 representing a shape of a magnetic field in a receiver. In FIG. 5, the vertical axis is a normalized step system response $$\frac{b}{b_0},$$

and the horizontal axis is time.

The magnetic field b(t) is normalized by a value of the magnetic field $b_0$ measured immediately after turning off current in the transmitter. As shown in FIG. 5, the magnetic field in the receiver is not a constant, but rather varies with time, both for the main and bucking receivers (shown as substantially overlapping in FIG. 5). A constant magnetic field would correspond to an ideally conductive carrier. In case of a material like steel for a carrier, having a finite conductivity, the eddy currents start penetrating through the carrier and this causes deviation of the magnetic field in the receiver from the constant. The variable in time magnetic field produces eddy currents in the formation, which in turn, induce a signal in the receiver.

Assuming that eddy current in the carrier is a secondary source with respect to the formation, the total signal in the presence of both the carrier and the formation may be presented through Duhamel's integral, which permits calculation of the response of a linear system to arbitrary time-varying external excitation:

$$s(t) = \int_0^t \bar{b}(t-\tau) \cdot \frac{df}{d\tau} d\tau = \int_0^t f(t-\tau) \cdot \frac{d\bar{b}}{d\tau} d\tau \qquad \text{Eq. (1)}$$

The following represents a discussion of the above approach for minimizing uncertainty in synthetic data when attempting to best-fit models to measured data for estimating sub-surface formations in the earth. FIGS. 6A-6F are plots of signals received at one or more receivers (voltage (vertical axis) as a function of time (horizontal axis)). Various of FIGS. 6A-6F include plots of a signal at a main receiver and a signal at a bucking receiver. Further, the plots include signals in the main and bucking receivers in the presence of a conductive carrier surrounded by a homogeneous formation of 1 Ω-m, 10 Ω-m, and 100 Ω-m. Accordingly, various signals are labeled as follows: main receiver-1 Ω-m will be labeled M1; main receiver-10 Ω-m will be labeled M2; main receiver-100 Ω-m will be labeled M3; bucking receiver-1

Ω-m will be labeled B1; bucking receiver-10 Ω-m will be labeled B2; bucking receiver-100 Ω-m will be labeled B3.

FIG. 6A shows a plot of simulated signals in a main receiver ($S_{main}(t)$) and a bucking receiver ($S_{bucking}(t)$) in the presence of a conductive carrier surrounded by homogeneous formations of 1 Ω-m (lines M1, B1), 10 Ω-m (lines M2, B2), and 100 Ω-m (lines M3, B3). The vertical axis is the voltage of the signal and the horizontal axis is the time.

FIG. 6B shows a derivation of bucked signals ($\Delta S(t)=S_{main}(t)-kS_{bucking}(t)$), where k is a bucking coefficient, minimally affected by the carrier and having a high sensitivity to the formation. In FIG. 6B, a bucked signal of a 1 Ω-m formation is labeled F1; a bucked signal of a 10 Ω-m formation is labeled F2; a bucked signal of a 100 Ω-m formation is labeled F3. The vertical axis is the voltage of the bucked signal ΔS and the horizontal axis is time.

The bucking coefficient k is a ratio between signals in the main and bucking receivers, which approaches with time a value of $$k = \left(\frac{D_2}{D_1}\right)^3;$$

where D2 and D1 are the spacing or distance of the main and bucking receivers, respectively (e.g., as shown in FIG. 4). The time moment used to calculate the bucking coefficient k is mainly driven by a thickness δ and a resistivity ρ of the carrier. One non-limiting method to estimate the bucking coefficient k is to calculate a ratio $$k = \frac{S_{main}(t)}{S_{bucking}(t)}$$

and average this ratio over a time window [$t_{min}$, $t_{max}$] centered with respect to a time $$t_0 \approx \frac{\mu_0 \delta^2}{2\rho},$$

where $t_{min} \approx 0.8 \cdot t_0$, $t_{max} \approx 1.2 \cdot t_0$, and $\mu_0 = 4\pi \cdot 10^{-7}$ H/m. For example, in a configuration with a carrier thickness δ=3 cm and a carrier resistivity ρ=0.7·10⁻⁶Ω, the estimate for $t_0$ is about 800 μs. By the time of $t_0$ the signal in the receiver is not practically affected by the formation and driven by the properties of the carrier.

The bucked signals of FIG. 6B were derived from the simulated signals of FIG. 6A as they deviate from an ideal dipole response. The ideal dipole responses for the associated formations are shown as lines I1, I2, and I3. The ideal dipole response is a response or signal that would be measured or detected if no carrier was present. In FIG. 6B, I1 is an ideal dipole response for a homogeneous formation of 1 Ω-m; I2 is an ideal dipole response for a homogeneous formation of 10 Ω-m; and I3 is an ideal dipole response for a homogeneous formation of 100 Ω-m. As shown in FIG. 6B, as the resistivity of the formation increases, so does the deviation.

Figure 6D:
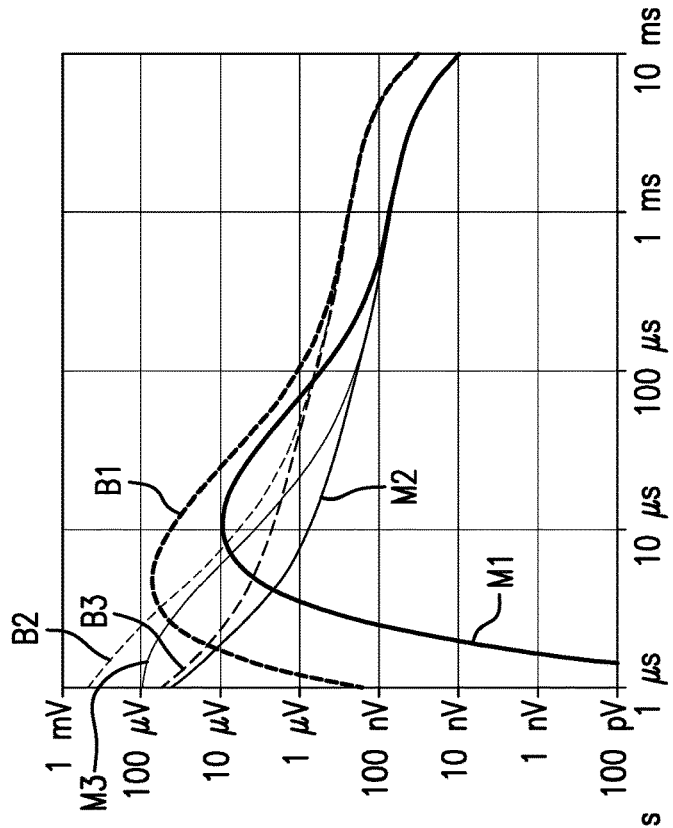
FIG. 6D is a schematic plot of convolved signals obtained via Duhamel's integral.
Figure 6C:
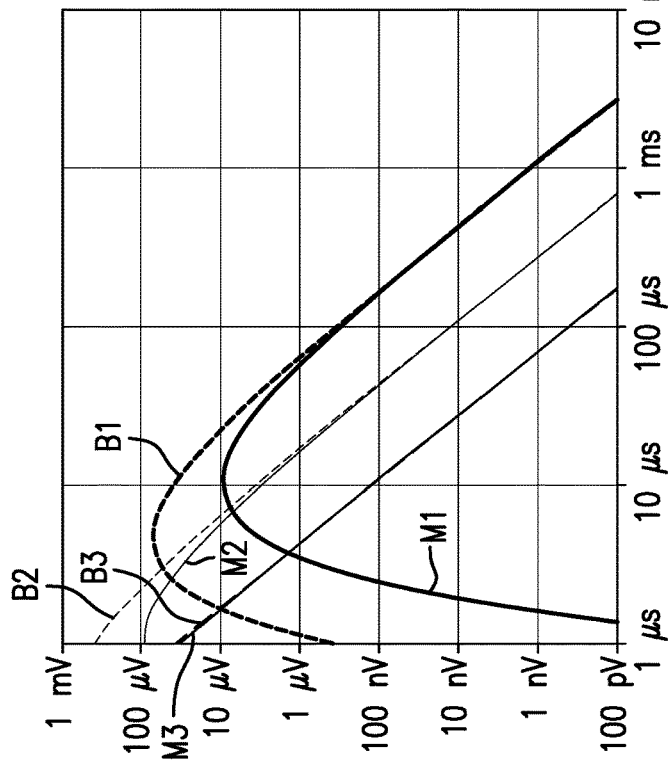
FIG. 6C is a schematic plot of calculated signals in homogenous formation in the absence of a carrier.

As shown in FIG. 6C, calculated signals (f(t)) in homogeneous formations of 1 Ω-m (lines M1, B1), 10 Ω-m (lines M2, B2), and 100 Ω-m (lines M3, B3) in the absence of a carrier are shown. The vertical axis is the voltage of the receiver signal in the absence of a carrier and the horizontal axis is time.

Duhamel's integral (Eq. (1)) is applied to f(t) and $\overline{b}(t)$ to derive a synthetic unbucked signals in the main receiver $S_{main}^{con}(t)$ and the bucking receiver $S_{bucking}^{con}(t)$. That is, convolved signals are generated for both main and bucking receivers, and for each homogeneous formation. The derived/convolved signals for the different formations are presented in FIG. 6D. The vertical axis is a voltage of a convolved receiver signal and the horizontal axis is time.

Figure 6F:
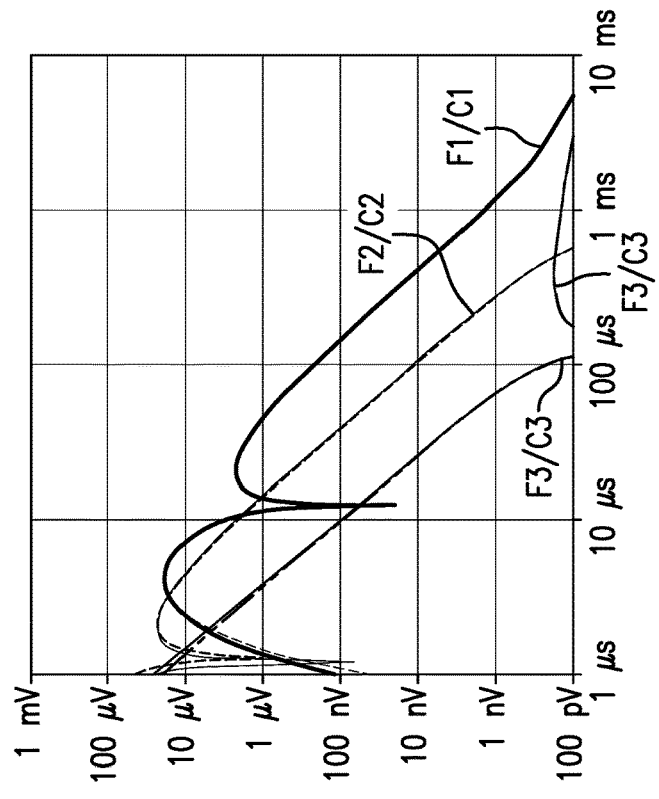
FIG. 6F is a schematic plot showing a comparison of a measured bucked signal and a synthetic bucked signal.
Figure 6E:
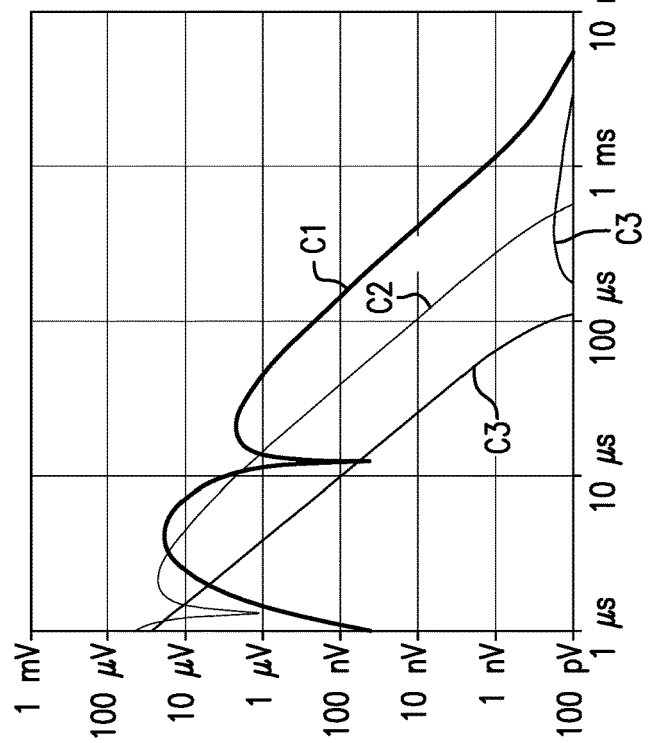
FIG. 6E is a schematic plot of bucked signals derived from the convolved signals shown in FIG. 6D.

Bucking is then be applied to the convolved signals $S_{main}^{con}(t)$ and $S_{bucking}^{con}(t)$ to achieve the synthetic bucked formation signals $\Delta S^{con}$ ($\Delta S^{con}(t)=S_{main}^{con}(t)-kS_{bucking}^{con}(t)$) that are minimally affected by the carrier, as shown in FIG. 6E. In FIG. 6E, a synthetic bucked formation signal $\Delta S^{con}$ of a 1 Ω-m formation is labeled C1; a synthetic buck formation signal $\Delta S^{con}$ of a 10 Ω-m formation is labeled C2; a synthetic bucked formation signal $\Delta S^{con}$ of a 100 Ω-m formation is labeled C3. The vertical axis is the voltage of the synthetic bucked formation signal $\Delta S^{con}$ and the horizontal axis is time.

Turning to FIG. 6F, the bucked signals ($\Delta S(t)=S_{main}(t)-kS_{bucking}(t)$; F1, F2, F3) shown in FIG. 6B are compared with the synthetic bucked signals ($\Delta S^{con}(t)=S_{main}^{con}(t)-kS_{bucking}^{con}(t)$; C1, C2, C3) shown in FIG. 6E. In FIG. 6F, the vertical axis is the voltage of the bucked signals and the synthetic bucked signals and the horizontal axis is time.

As shown, for all formation resistivities, the synthetic bucked signals ($\Delta S^{con}$) coincide with the bucked signals (ΔS) in the time range up to 200 μs. Further, for formations with resistivity 10 Ω-m and below, the overlap is observed in the time intervals above 200 μs. An estimate of a skin depth Δ, normally associated with the depth of investigation, for a ρ=10Ω formation and 200 μs observation time gives $$\Delta = \sqrt{\frac{2t\rho}{\mu_0}} = \sqrt{\frac{2 \cdot 200 \cdot 10^{-6} \cdot 10}{1.256 \cdot 10^{-6}}} = 56 \ m.$$

This implicitly indicates a sufficient time range needed for the most practical needs of geo-steering, and thus accurate analysis and/or models of an earth formation may be made in a timely manner such that a drilling operation or other downhole operation may be adjusted and/or modified to account for changes in models over time.

Figure 7:
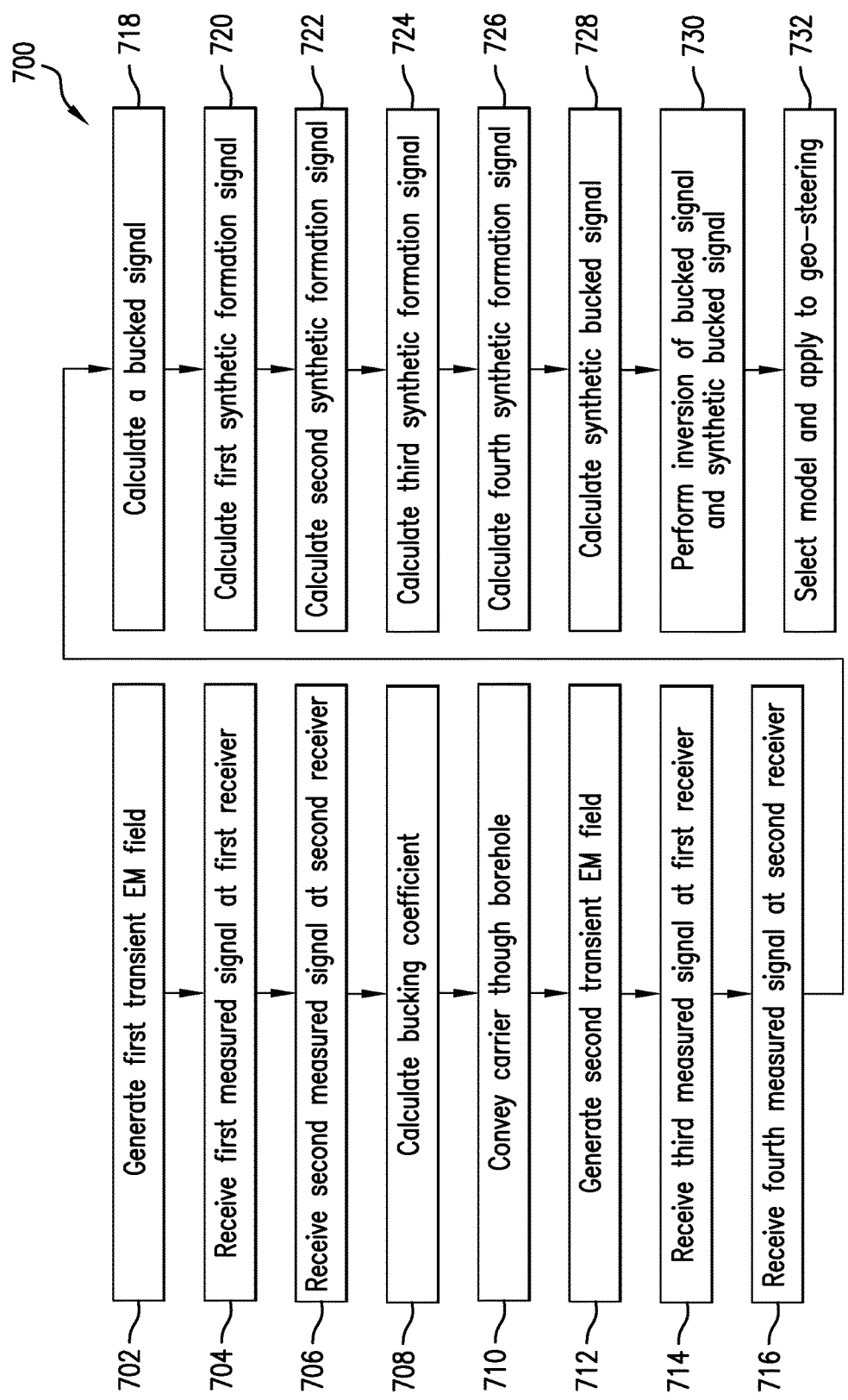
FIG. 7 is a flow process for estimating a property of an earth formation penetrated by a borehole in accordance with an embodiment of the present disclosure.

Turning now to FIG. 7, a flow process 700 in accordance with an embodiment of the present disclosure is shown. The flow process 700 may be employed in a system similar to that shown in FIG. 1, although other configurations are contemplated and may take advantage of embodiments provided herein. The flow process 700, or portions thereof, may be used in application at or near a borehole through which a carrier will be conveyed and formation properties are to be estimated.

As shown at block 702, a first transient electromagnetic field is generated by a transmitter on a carrier. The first transient electromagnetic field is generated when the carrier is not within the borehole. That is, the first transient electromagnetic field is generated by the transmitter when the field would not be affected by the formation. Thus, any detected or received signal due to the first transient electromagnetic field would be a result of a conductivity of the carrier, and not affected by a conductivity of a formation. In some embodiments, a transmitting current to generate the first transient electromagnetic field in the carrier may have a shape of a step function u(t).

At block 704, a first receiver on the carrier receives a first measured signal due to the first transient electromagnetic field. As noted, the first measured signal is a signal received at the first receiver along the carrier when the carrier is not within a borehole, and thus the first measured signal is not affected by a formation. The first measured signal, in some embodiments, is represented as $S_{main}(t)$ taken in the absence of a formation.

At block 706, a second receiver on the carrier receives a second measured signal due to the first transient electromagnetic field. Similar to the first measured signal, the second measured signal is a signal received at the second receiver along the carrier when the carrier is not within a borehole, and thus the second measured signal is not affected by a formation. The second measured signal, in some embodiments, is represented as $S_{bucking}(t)$ taken in the absence of a formation.

At block 708, a bucking coefficient k is calculated. The bucking coefficient is calculated from the measurements of the first transient magnetic field (in some embodiments including a system step response) by first (e.g., main) and second (e.g., bucking) receivers on a carrier taken in the absence of a formation, e.g., when surrounded by air or no formation is present. In block 708, the measurements obtained from blocks 704 and 706 are used to estimate the bucking coefficient k using a ratio $$k = \frac{S_{main}(t)}{S_{bucking}(t)},$$

as described above. In some embodiments, the estimation of the coefficient k is based on a time window $[t_{min}, t_{max}]$ centered with respect to a time $$t_0 \approx \frac{\mu_0 \delta^2}{2\rho}.$$

After the measurements required for the bucking coefficient k are obtained, the carrier is conveyed into the borehole, as shown at block 710.

At block 712, with the carrier located or disposed downhole, a second transient electromagnetic field is generated from the transmitter on the carrier. In this configuration, the resulting signals will be impacted by the presence of the formation that is downhole, and is a formation of interest for estimating a property thereof.

At block 714, the first receiver receives a third measured signal. The third measured signal is a signal that is due to the second transient electromagnetic field with the carrier downhole, and thus affected by the formation. As this is a measured signal at the first (or main) receiver, this may be represented as $b_1'(t)$ or $S_{main}(t)$ taken in the presence of a formation.

At block 716, the second receiver receives a fourth measured signal. The fourth measured signal is a signal that is due to the second transient electromagnetic field with the carrier downhole, and thus affected by the formation. As this is a measured signal at the second (or bucking) receiver, this may be represented as $b_2'(t)$ or $S_{bucking}(t)$ taken in the presence of a formation.

At block 718, a bucked signal is calculated. The bucked signal is calculated using the calculated bucking coefficient k, the third measured signal, and the fourth measured signal. For example, the calculated bucked signal may be represented as $\Delta S$, and found using: $\Delta S(t) = S_{main}(t) - kS_{bucking}(t)$.

At block 720, a first synthetic formation signal $f_1(t)$ is calculated, wherein f(t) is a formation response, which represents a signal in the receiver excited by the transmitter in the absence of the carrier. The first synthetic formation signal is a simulated or otherwise calculated signal that would be received by the first receiver in the presence of a formation, but in the absence of the carrier. That is, the first synthetic signal is a signal representing a signal that would exist if the second transient electromagnetic field was only affected by the formation (and not affected by the presence of the carrier) when the transmitter and first receiver (e.g., the carrier) was disposed downhole.

At block 722, a second synthetic formation signal $f_2(t)$ is calculated, wherein f(t) is a formation response, which represents a signal in the receiver excited by the transmitter in the absence of the carrier. The second synthetic formation signal is a simulated or otherwise calculated signal that would be received by the second receiver in the presence of a formation, but in the absence of the carrier. That is, the second synthetic signal is a signal representing a signal that would exist if the second transient electromagnetic field was only affected by the formation (and not affected by the presence of the carrier) when the transmitter and second receiver (e.g., the carrier) was disposed downhole.

At block 724, a third synthetic formation signal is calculated. The third synthetic formation signal is calculated by applying a Duhamel's integral to the first measured signal and the first synthetic formation signal. This may be represented as $$S_{main}^{con}(t) = \int_0^t \overline{b_1}(t-\tau) \cdot \frac{df_1}{d\tau} d\tau = \int_0^t f_1(t-\tau) \cdot \frac{d\overline{b_1}}{d\tau} d\tau.$$

At block 726, a fourth synthetic formation signal is calculated. The fourth synthetic formation signal is calculated by applying a Duhamel's integral to the second measured signal and the second synthetic formation signal. This may be represented as $$S_{bucking}^{con}(t) = \int_0^t \overline{b_2}(t-\tau) \cdot \frac{df_2}{d\tau} d\tau = \int_0^t f_2(t-\tau) \cdot \frac{d\overline{b_2}}{d\tau} d\tau.$$

At block 728, a synthetic bucked signal is calculated. The synthetic bucked signal is calculated by using the calculated bucking coefficient k, the third synthetic formation signal, and the fourth synthetic formation signal. This may be calculated as $\Delta S^{con}(t) = S_{main}^{con}(t) - kS_{bucking}^{con}(t)$.

At block 730, an inversion with respect to a formation model is performed to extract and/or model properties of the formation, and thus adjust geo-steering of the carrier. In accordance with some embodiments, the inversion includes a process of matching measured data to the model. Typically, the least square norm is used to characterize the goodness of matching. The measurements are well matched by the model if they deviate from the corresponding synthetic data not more than one standard deviation of noise.

At block 732, a best-fit model is be selected from the inversion, and thus properties of the formation may be determined and geo-steering may be adjusted appropriately based on the selected model (and thus the features, characteristics, and/or properties of the formation).

In accordance with some embodiments, the extracted property is a resistivity of an earth formation such that an operator may make informed decisions regarding geo-steering. Accordingly, embodiments provided herein may improve downhole operations, including but not limited to, improving efficiencies in measurement-while-drilling operations.

In sum, in accordance with embodiments provided herein, a method and/or process for determining a resistivity property of an earth formation (or other properties) is provided. The process includes producing a transient electromagnetic signal using a transmitter on a carrier in the presence of air (e.g., without a formation present) and using at least two receivers on the carrier for producing an output signal unaffected by the formation. The output signal is be affected by a finite, non-zero conductivity of the carrier; and using a processor for calculating a bucking coefficient k. The carrier (and the transmitter/receivers) is conveyed in a borehole and produces an output signal affected by the formation. The output formation signal is affected by the finite, non-zero conductivity of the carrier. From the measured output signal downhole, a bucked transient signal is calculated using borehole measurements and the bucking coefficient. Further, a synthetic signal using an initial model is generated, using Duhamel's integral applied to signals of formation signals in the absence of the carrier and a system step response. In some embodiments, the initial model includes a formation property and the bucking coefficient. An inversion is performed to match the bucked measured signal and the bucked synthetic signal.

As described above, the bucking coefficient k, in some embodiments, is calculated as an averaged-over-time ratio between two received signals $$k = \frac{S_{main}(t)}{S_{bucking}(t)}$$

when a time averaging widow is centered with respect to a time $$t_0 \approx \frac{\mu_0 \delta^2}{2\rho},$$

where $\delta$ and $\rho$ are thickness and resistivity of a carrier, respectively, and $\mu_0 = 4\pi \cdot 10^{-7}$ H/m. In some embodiments $t_{min} \approx 0.8\ t_0$ and $t_{max} \approx 1.2\ t_0$. Further, in some embodiments, the bucking coefficient can be calculated based on a ratio spacing of the main and bucking receivers, such that $$k = \left(\frac{D_2}{D_1}\right)^3,$$

wherein $D_2$ is a distance of a bucking receiver from a transmitter and $D_1$ is a distance of a main receiver from a transmitter.

Set forth below are some embodiments of the foregoing disclosure:

Embodiment 1

A method for estimating a property of an earth formation penetrated by a borehole, the method comprising: generating a first transient electromagnetic field with a transmitter on a carrier located outside of the borehole; receiving at a first receiver on the carrier a first measured signal due to the first transient electromagnetic field, the first measured signal affected by a finite, non-zero conductivity of the carrier; receiving at a second receiver on the carrier a second measured signal due to the first transient electromagnetic field, the second measured signal affected by a finite, non-zero conductivity of the carrier; calculating, with a processor, a bucking coefficient k using the first measured signal and the second measured signal, the bucking coefficient based on a ratio of the first measured signal and the second measured signal; conveying the carrier through a borehole; generating a second transient electromagnetic field using the transmitter on the carrier when the carrier is disposed within the borehole; receiving a third measured signal at the first receiver, the third measured signal being a signal generated in the presence of the formation due to the second transient electromagnetic field; receiving a fourth measured signal at the second receiver, the fourth measured signal being a signal generated in the presence of the formation due to the second transient electromagnetic field; calculating, with the processor, a bucked signal using the bucking coefficient k, the third measured signal, and the fourth measured signal; calculating, with the processor, a first synthetic formation signal of the first receiver representing a signal received by the first receiver in the absence of the carrier; calculating, with the processor, a second synthetic formation signal of the second receiver representing a signal received by the second receiver in the absence of the carrier; calculating, with the processor, a third synthetic formation signal by applying a Duhamel's integral to the first measured signal and the first synthetic formation signal; calculating, with the processor, a fourth synthetic formation signal by applying a Duhamel's integral to the second measured signal and the second synthetic formation signal; calculating a synthetic bucked signal using the calculated bucking coefficient k, the third synthetic formation signal, and the fourth synthetic formation signal; and performing an inversion of a formation model to estimate a property of the formation such that an inverted synthetic bucked signal and an inverted bucked signal coincide within a predetermined range.

Embodiment 2

The method of embodiment 1, wherein the first measured signal and the second measured signal are each signals that are unaffected by the formation.

Embodiment 3

The method of embodiment 1, further comprising adjusting a drilling operation based on the estimated property of the formation.

Embodiment 4

The method of embodiment 1, wherein calculating the bucked signal comprises: $\Delta S(t) = S_{main}(t) - kS_{bucking}$, wherein $\Delta S(t)$ is the calculated bucked signal, $S_{main}(t)$ is the first measured signal, and $S_{bucking}(t)$ is the second measured signal.

Embodiment 5

The method of embodiment 1, wherein calculating the synthetic bucked signal comprises: $\Delta S^{con}(t) = S_{main}^{con}(t) - kS_{bucking}^{con}(t)$, wherein $\Delta S^{con}(t)$ is the synthetic bucked signal, $S_{main}^{con}(t)$ is the third synthetic formation signal, and $S_{bucking}^{con}(t)$ is the fourth synthetic formation signal.

Embodiment 6

The method of embodiment 1, wherein the bucking coefficient is determined by:

$$k = \left(\frac{D_2}{D_1}\right)^3,$$

wherein $D_2$ is a distance between the second receiver and the transmitter, and $D_1$ is a distance between the first receiver and the transmitter.

Embodiment 7

The method of embodiment 1, wherein the bucking coefficient is determined by $$k = \frac{S_{main}(t)}{S_{bucking}(t)},$$

wherein $S_{main}(t)$ is the first measured signal and $S_{bucking}(t)$ is second measured signal over a time range from $t_{min}$ to $t_{max}$, centered around a time $t0$.

Embodiment 8

The method of embodiment 7, wherein $$t_0 \approx \frac{\mu_0 \delta^2}{2\rho}.$$

Embodiment 9

The method of embodiment 8, wherein $t_{min} \approx 0.8 \cdot t_0$ and $t_{max} \approx 1.2 \cdot t_0$.

Embodiment 10

The method of embodiment 1, further comprising selecting a model based on the match of the synthetic bucked signal with the bucked signal to estimate the property of the formation.

Embodiment 11

The method of embodiment 1, wherein the property of the formation is a resistivity of the formation.

Embodiment 12

A system for estimating a property of an earth formation penetrated by a borehole, the system comprising: a carrier configured to be conveyed through a borehole; a transmitter disposed on the carrier and configured to transmit transient electromagnetic fields; a first receiver disposed on the carrier a first distance from the transmitter and configured to receive signals from the transmitter; a second receiver disposed on the carrier a second distance from the transmitter and configured to receive signals from the transmitter; and a processor configured to estimate a property of the formation, the system configured to: generate a first transient electromagnetic field with the transmitter when the carrier is located outside of the borehole; receive at the first receiver a first measured signal due to the first transient electromagnetic field, the first measured signal affected by a finite, non-zero conductivity of the carrier; receive at the second receiver a second measured signal due to the first transient electromagnetic field, the second measured signal affected by a finite, non-zero conductivity of the carrier; calculate, with the processor, a bucking coefficient k using the first measured signal and the second measured signal, the bucking coefficient based on a ratio of the first measured signal and the second measured signal; generate a second transient electromagnetic field using the transmitter on the carrier when the carrier is disposed within the borehole; receive a third measured signal at the first receiver, the third measured signal being a signal generated in the presence of the formation due to the second transient electromagnetic field; receive a fourth measured signal at the second receiver, the fourth measured signal being a signal generated in the presence of the formation due to the second transient electromagnetic field; calculate, with the processor, a bucked signal using the bucking coefficient k, the third measured signal, and the fourth measured signal; calculate, with the processor, a first synthetic formation signal of the first receiver representing a signal received by the first receiver in the absence of the carrier; calculate, with the processor, a second synthetic formation signal of the second receiver representing a signal received by the second receiver in the absence of the carrier; calculate, with the processor, a third synthetic formation signal by applying a Duhamel's integral to the first measured signal and the first synthetic formation signal; calculate, with the processor, a fourth synthetic formation signal by applying a Duhamel's integral to the second measured signal and the second synthetic formation signal; calculate a synthetic bucked signal using the calculated bucking coefficient k, the third synthetic formation signal, and the fourth synthetic formation signal; perform, with the processor, an inversion of a formation model to estimate a property of the formation such that an inverted synthetic bucked signal and an inverted bucked signal coincide within a predetermined range.

Embodiment 13

The method of embodiment 12, wherein the first measured signal and the second measured signal are each signals that are unaffected by the formation.

Embodiment 14

The system of embodiment 12, wherein the measured bucked signal comprises: $\Delta S(t) = S_{main}(t) - kS_{bucking}$, wherein $\Delta S(t)$ is the calculated bucked signal, $S_{main}(t)$ is the first measured signal, and $S_{bucking}(t)$ is the second measured signal.

Embodiment 15

The system of embodiment 12, wherein the synthetic bucked signal comprises: $\Delta S^{con}(t) = S_{main}^{con}(t) - kS_{bucking}^{con}$ (t), wherein $\Delta S^{con}(t)$ is the synthetic bucked signal, $S_{main}^{con}(t)$ is the third synthetic formation signal, and $S_{bucking}^{con}(t)$ is the fourth synthetic formation signal.

Embodiment 16

The system of embodiment 12, wherein the bucking coefficient is determined by:

$$k = \left(\frac{D_2}{D_1}\right)^3,$$

wherein D2 is a distance between the second receiver and the transmitter, and D1 is a distance between the first receiver and the transmitter.

Embodiment 17

The system of embodiment 12, wherein the bucking coefficient is determined by $$k = \frac{S_{main}(t)}{S_{bucking}(t)},$$

wherein $S_{main}(t)$ is the first measured signal and $S_{bucking}(t)$ is the second measured signal over a time from tmin to tmax, centered around a time t0.

Embodiment 18

The system of embodiment 17, wherein $$t_0 \approx \frac{\mu_0 \delta^2}{2\rho}.$$

Embodiment 19

The system of embodiment 18, wherein $t_{min} \approx 0.8 \cdot t_0$ and $t_{max} \approx 1.2 \cdot t_0$.

Embodiment 20

The system of embodiment 12, wherein estimating a property of the formation comprises selecting a model based on a match of the synthetic bucked signal with the bucked signal.

Embodiment 21

The system of embodiment 12, wherein the property of the formation is a resistivity of the formation.

The systems and methods described herein provide various advantages. For example, various embodiments provided herein may provide improved and/or efficient processes for estimating a formation property. Such efficient and improved estimation may be made in improved timeframes, thus enabling an operator to make informed decisions regarding drilling and/or other downhole operations, and make adjustments thereto, as needed. Further advantages of various embodiments may include providing a very fast and accurate estimation of formation properties as compared to prior processes for making similar estimations.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" do not denote a particular order, but are used to distinguish different elements.

The flow diagram depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A method for estimating a property of an earth formation penetrated by a borehole, the method comprising:
    generating a first transient electromagnetic field with a transmitter on a carrier located outside of the borehole;
    receiving at a first receiver on the carrier a first measured signal due to the first transient electromagnetic field, the first measured signal affected by a finite, non-zero conductivity of the carrier;
    receiving at a second receiver on the carrier a second measured signal due to the first transient electromagnetic field, the second measured signal affected by a finite, non-zero conductivity of the carrier;
    calculating, with a processor, a bucking coefficient k using the first measured signal and the second measured signal, the bucking coefficient based on a ratio of the first measured signal and the second measured signal;
    conveying the carrier through a borehole;
    generating a second transient electromagnetic field using the transmitter on the carrier when the carrier is disposed within the borehole;
    receiving a third measured signal at the first receiver, the third measured signal being a signal generated in the presence of the formation due to the second transient electromagnetic field;
    receiving a fourth measured signal at the second receiver, the fourth measured signal being a signal generated in the presence of the formation due to the second transient electromagnetic field;
    calculating, with the processor, a bucked signal using the bucking coefficient k, the third measured signal, and the fourth measured signal;
    calculating, with the processor, a first synthetic formation signal of the first receiver representing a signal received by the first receiver in the absence of the carrier;
    calculating, with the processor, a second synthetic formation signal of the second receiver representing a signal received by the second receiver in the absence of the carrier;
    calculating, with the processor, a third synthetic formation signal by applying a Duhamel's integral to the first measured signal and the first synthetic formation signal;
    calculating, with the processor, a fourth synthetic formation signal by applying a Duhamel's integral to the second measured signal and the second synthetic formation signal;
    calculating a synthetic bucked signal using the calculated bucking coefficient k, the third synthetic formation signal, and the fourth synthetic formation signal; and
    performing an inversion of a formation model to estimate a property of the formation such that an inverted synthetic bucked signal and an inverted bucked signal coincide within a predetermined range.

2. The method of claim 1, wherein the first measured signal and the second measured signal are each signals that are unaffected by the formation.

3. The method of claim 1, further comprising adjusting a drilling operation based on the estimated property of the formation.

4. The method of claim 1, wherein calculating the bucked signal comprises: $\Delta S(t)=S_{main}(t)-kS_{bucking}$, wherein $\Delta S(t)$ is the calculated bucked signal, $S_{main}(t)$ is the first measured signal, and $S_{bucking}(t)$ is the second measured signal.

5. The method of claim 1, wherein calculating the synthetic bucked signal comprises: $\Delta S^{con}(t)=S_{main}^{con}(t)-kS_{bucking}^{con}(t)$, wherein $\Delta S^{con}(t)$ is the synthetic bucked signal, $S_{main}^{con}(t)$ is the third synthetic formation signal, and $S_{bucking}^{con}(t)$ is the fourth synthetic formation signal.

6. The method of claim 1, wherein the bucking coefficient is determined by:

$$k = \left(\frac{D_2}{D_1}\right)^3,$$

wherein $D_2$ is a distance between the second receiver and the transmitter, and $D_1$ is a distance between the first receiver and the transmitter.

7. The method of claim 1, wherein the bucking coefficient is determined by $$k = \frac{S_{main}(t)}{S_{bucking}(t)},$$

wherein $S_{main}(t)$ is the first measured signal and $S_{bucking}(t)$ is second measured signal over a time range from $t_{min}$ to $t_{max}$, centered around a time $t_0$.

8. The method of claim 7, wherein $$t_0 \approx \frac{\mu_0 \delta^2}{2\rho}.$$

9. The method of claim 8, wherein $t_{min} \approx 0.8 \cdot t_0$ and $t_{max} \approx 1.2 \cdot t_0$.

10. The method of claim 1, further comprising selecting a model based on the match of the synthetic bucked signal with the bucked signal to estimate the property of the formation.

11. The method of claim 1, wherein the property of the formation is a resistivity of the formation.

12. A system for estimating a property of an earth formation penetrated by a borehole, the system comprising:
    a carrier configured to be conveyed through a borehole;
    a transmitter disposed on the carrier and configured to transmit transient electromagnetic fields;

a first receiver disposed on the carrier a first distance from the transmitter and configured to receive signals from the transmitter;

a second receiver disposed on the carrier a second distance from the transmitter and configured to receive signals from the transmitter; and a processor configured to estimate a property of the formation, the system configured to:

generate a first transient electromagnetic field with the transmitter when the carrier is located outside of the borehole;

receive at the first receiver a first measured signal due to the first transient electromagnetic field, the first measured signal affected by a finite, non-zero conductivity of the carrier;

receive at the second receiver a second measured signal due to the first transient electromagnetic field, the second measured signal affected by a finite, non-zero conductivity of the carrier;

calculate, with the processor, a bucking coefficient k using the first measured signal and the second measured signal, the bucking coefficient based on a ratio of the first measured signal and the second measured signal;

generate a second transient electromagnetic field using the transmitter on the carrier when the carrier is disposed within the borehole;

receive a third measured signal at the first receiver, the third measured signal being a signal generated in the presence of the formation due to the second transient electromagnetic field;

receive a fourth measured signal at the second receiver, the fourth measured signal being a signal generated in the presence of the formation due to the second transient electromagnetic field;

calculate, with the processor, a bucked signal using the bucking coefficient k, the third measured signal, and the fourth measured signal;

calculate, with the processor, a first synthetic formation signal of the first receiver representing a signal received by the first receiver in the absence of the carrier;

calculate, with the processor, a second synthetic formation signal of the second receiver representing a signal received by the second receiver in the absence of the carrier;

calculate, with the processor, a third synthetic formation signal by applying a Duhamel's integral to the first measured signal and the first synthetic formation signal;

calculate, with the processor, a fourth synthetic formation signal by applying a Duhamel's integral to the second measured signal and the second synthetic formation signal;

calculate a synthetic bucked signal using the calculated bucking coefficient k, the third synthetic formation signal, and the fourth synthetic formation signal; and perform, with the processor, an inversion of a formation model to estimate a property of the formation such that an inverted synthetic bucked signal and an inverted bucked signal coincide within a predetermined range.

13. The system of claim 12, wherein the first measured signal and the second measured signal are each signals that are unaffected by the formation.

14. The system of claim 12, wherein the measured bucked signal comprises: $\Delta S(t)=S_{main}(t)-kS_{bucking}$, wherein $\Delta S(t)$ is the calculated bucked signal, $S_{main}(t)$ is the first measured signal, and $S_{bucking}(t)$ is the second measured signal.

15. The system of claim 12, wherein the synthetic bucked signal comprises: $\Delta S^{con}(t)=S_{main}^{con}(t)-kS_{bucking}^{con}(t)$, wherein $\Delta S^{con}(t)$ is the synthetic bucked signal, $S_{main}^{con}(t)$ is the third synthetic formation signal, and $S_{bucking}^{con}(t)$ is the fourth synthetic formation signal.

16. The system of claim 12, wherein the bucking coefficient is determined by:

$$k = \left(\frac{D_2}{D_1}\right)^3,$$

wherein $D_2$ is a distance between the second receiver and the transmitter, and $D_1$ is a distance between the first receiver and the transmitter.

17. The system of claim 12, wherein the bucking coefficient is determined by $$k = \frac{S_{main}(t)}{S_{bucking}(t)},$$

wherein $S_{main}(t)$ is the first measured signal and $S_{bucking}(t)$ is the second measured signal over a time from $t_{min}$ to $t_{max}$, centered around a time $t_0$.

18. The system of claim 17, wherein $$t_0 \approx \frac{\mu_0 \delta^2}{2\rho}.$$

19. The system of claim 18, wherein $t_{min} \approx 0.8 \cdot t_0$ and $t_{max} \approx 1.2 \cdot t_0$.

20. The system of claim 12, wherein estimating a property of the formation comprises selecting a model based on a match of the synthetic bucked signal with the bucked signal.

21. The system of claim 12, wherein the property of the formation is a resistivity of the formation.

* * * * *